United States Patent [19]

Higurashi

[11] Patent Number: 4,768,108
[45] Date of Patent: Aug. 30, 1988

[54] MAGNETIC RECORDING AND REPRODUCING SYSTEM

[75] Inventor: Seiji Higurashi, Chiba, Japan

[73] Assignee: Victor Company of Japan, Ltd., Yokohama, Japan

[21] Appl. No.: 18,153

[22] Filed: Feb. 24, 1987

[30] Foreign Application Priority Data

Feb. 24, 1986 [JP] Japan .................. 61-38929

[51] Int. Cl.$^4$ .................. A04N 5/782; G11B 20/10
[52] U.S. Cl. .................. 360/19.1; 360/32; 360/27; 360/13; 358/343; 369/3; 369/48; 369/83
[58] Field of Search .................. 360/19.1, 32, 23, 20, 360/27, 13; 358/343; 369/3, 2, 48, 47, 83

[56] References Cited

U.S. PATENT DOCUMENTS

| | | | |
|---|---|---|---|
| 4,363,049 | 12/1982 | Ohtsuki | 360/32 |
| 4,467,370 | 8/1984 | Hoshino | 360/13 |
| 4,541,089 | 9/1985 | Watanabe | 360/13 |
| 4,549,229 | 10/1985 | Nakano | 360/19.1 |

Primary Examiner—Alan Faber
Attorney, Agent, or Firm—Michael N. Meller

[57] ABSTRACT

A magnetic recording and reproducing system comprises a separating circuit for separating samples constituting a digital audio signal into odd and even numbered samples within each field of an input video signal by assigning sequential numbers to the samples which are sequentially obtained by the sampling, a first circuit for delaying the odd (or even) numbered samples by a predetermined time, an encoder for encoding delayed odd (or even) samples and undelayed even (or odd) samples obtained from the separating circuit for every one field and for producing an encoded digital audio signal, a decoder for decoding the encoded digital audio signal reproduced from a magnetic tape and for producing the delayed samples and the undelayed samples, a second circuit for delaying the undelayed samples from the decoder by the predetermined time, and a circuit for producing a reproduced digital audio signal from the delayed samples obtained from the decoder and delayed samples obtained from the second circuit and for producing a reproduced analog audio signal by subjecting the reproduced digital audio signal to a digital-to-analog conversion, so that a click noise is minimized at a joint of two successive recordings.

12 Claims, 9 Drawing Sheets

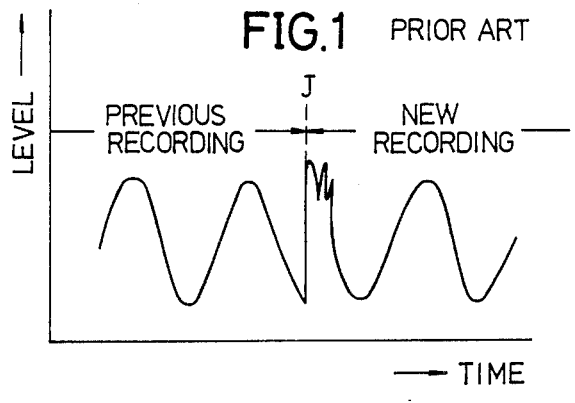
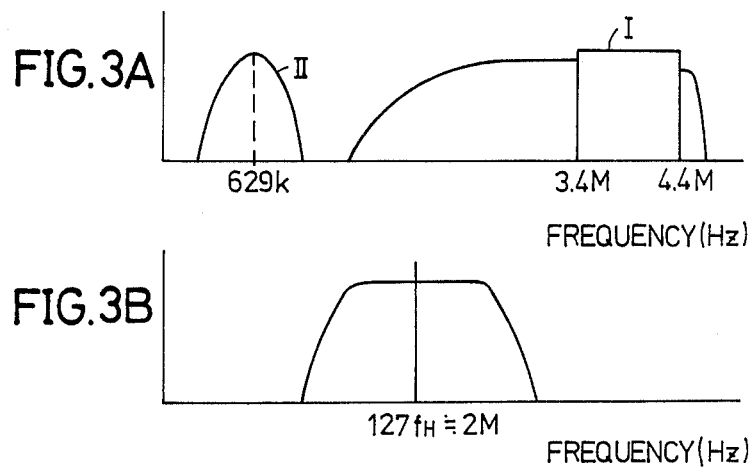

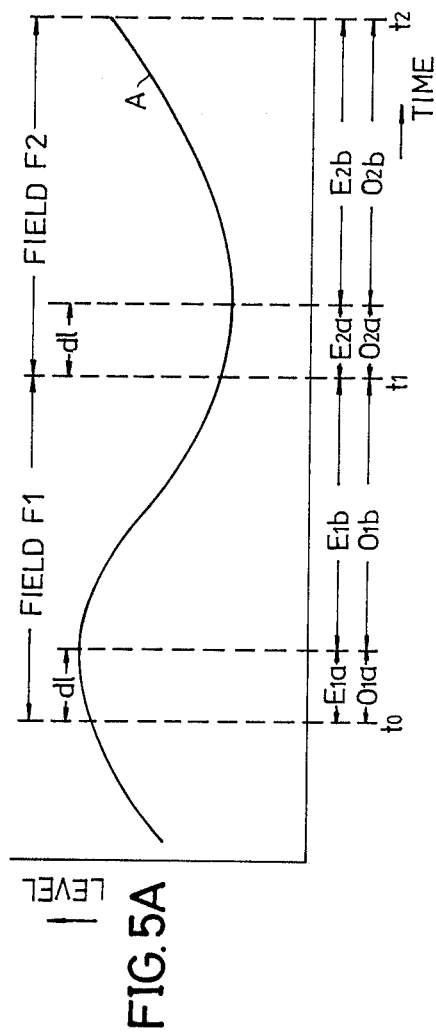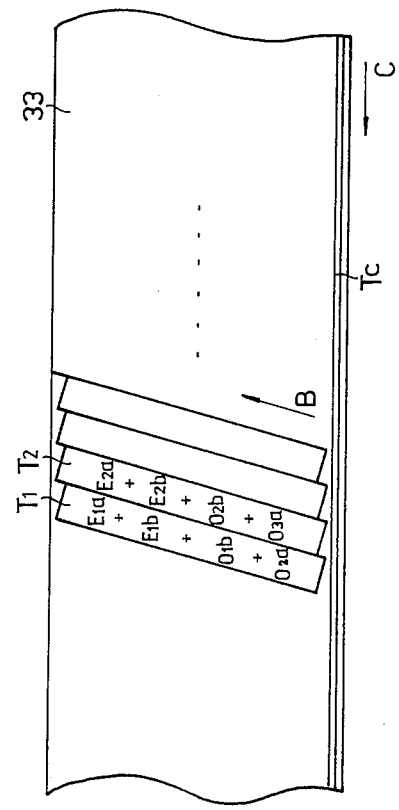

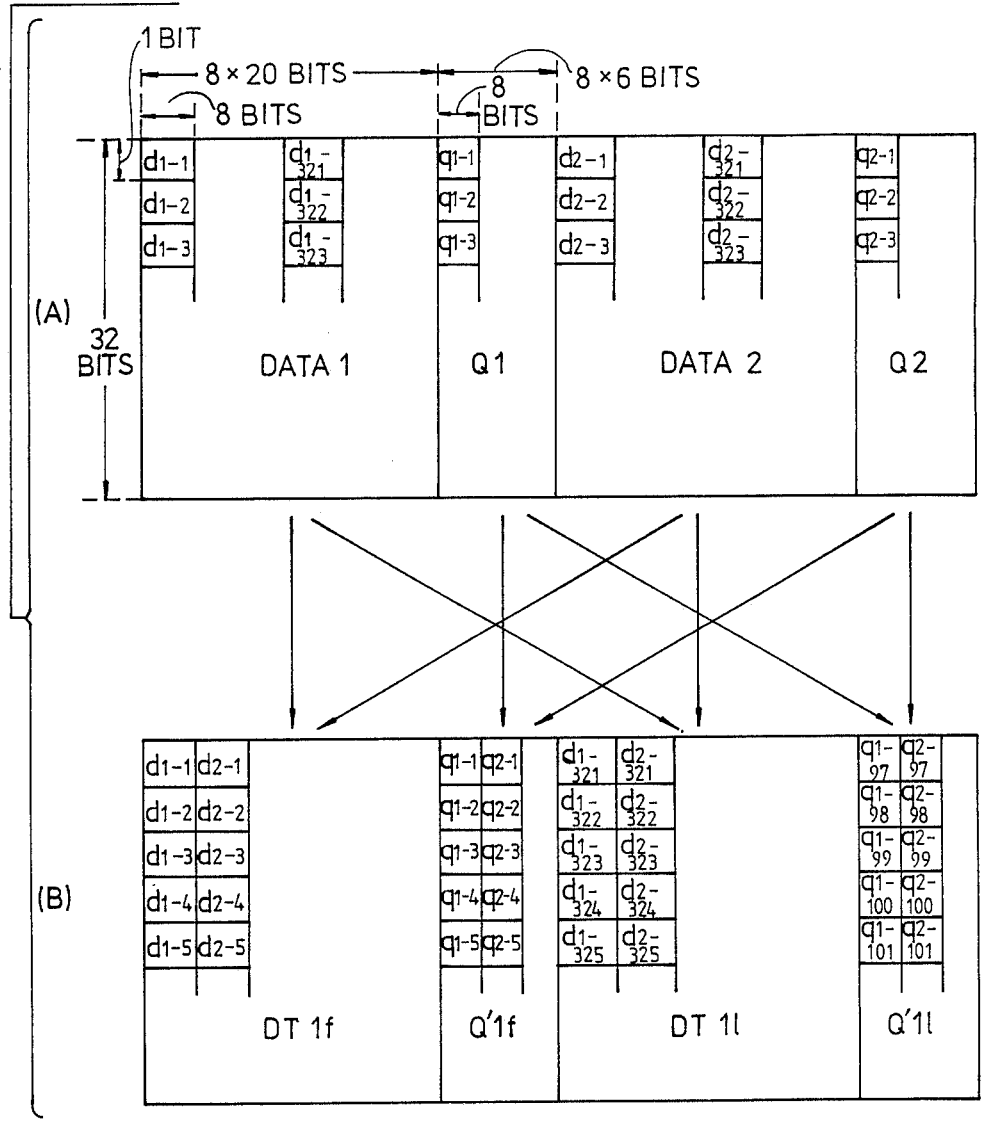

MAGNETIC RECORDING AND REPRODUCING SYSTEM

BACKGROUND OF THE INVENTION

The present invention generally relates to magnetic recording and reproducing systems, and more particularly to a magnetic recording and reproducing system which records and reproduces a video signal and a digital audio signal on and from oblique tracks of a magnetic tape.

Conventionally, there are systems for recording and reproducing a frequency modulated (FM) audio signal on and from a deep layer portion of a magnetic layer on a magnetic tape by use of rotary audio heads and recording and reproducing a video signal on and from a surface layer portion of the magnetic layer on the magnetic tape by use of rotary video heads. According to such systems, the phase of a reproduced FM audio signal obtained from one rotary audio head does not coincide perfectly with the phase of a reproduced FM audio signal obtained from the other rotary audio head at a joint where the switching of the rotary audio heads takes place, due to a difference in the tension of the magnetic tape and the like. As a result, a pulse noise is generated in an audio signal which is obtained by demodulating the reproduced FM audio signal. In addition, since the FM audio signal is an analog signal, the quality of the audio signal becomes deteriorated every time a dub-recording is carried out on the FM audio signal.

For these reasons, in the so-called 8-mm video tape recorders or cameras, a digital audio signal is recorded in a portion of a track which is recorded by the rotary video head. The digital audio signal is subjected to a time base compression before the recording so that it is possible to avoid recording and reproduction at the joint where the switching of the heads takes place, and it is thus possible to prevent the generation of the pulse noise. Furthermore, the deterioration in the quality of the audio signal introduced by the dub-recording is extremely small because the audio signal is recorded and reproduced in the form of a digital signal.

In the 8-mm video tape recorder, error check and correction codes are produced from the digitized audio signal for every one field of the video signal, and a digital audio signal is obtained by an interleaving. Accordingly, the codes are completed within one track. When an assembly editing is carried out to record a new digital audio signal from an arbitrary track of a pre-recorded magnetic tape, it is possible to completely reproduce the previously recorded digital audio signal and the newly recorded digital audio signal even at a joint on the magnetic tape where the assembly editing was started. However, when both the previously recorded digital audio signal and the newly recorded digital audio signal are reproduced and converted into analog audio signals, there is a problem in that a large click noise is generated at the joint of the reproduced analog audio signals.

SUMMARY OF THE INVENTION

Accordingly, it is a general object of the present invention to provide a novel and useful magnetic recording and reproducing system in which the problems described heretofore are eliminated.

Another and more specific object of the present invention is to provide a magnetic recording and reproducing system comprising first video signal processing means for subjecting an input video signal in conformance with a standard television system to a predetermined signal processing and for producing a video information signal having a predetermined signal format suited for magnetic tape recording and reproduction, first recording and reproducing means for recording and reproducing the video information signal on and from tracks formed obliquely to a longitudinal direction of a magnetic tape, second video signal processing means for subjecting the video information signal reproduced by the first recording and reproducing means to a predetermined signal processing and for producing a reproduced video signal in conformance with the standard television system, converting means for sampling an input analog audio signal and for producing a digital audio signal, odd/even sample separating means for separating samples constituting the digital audio signal into odd numbered samples and even numbered samples within each field of the input video signal by assigning consecutive numbers to the samples which are sequentially obtained by the sampling in the converting means, first delay means for delaying one of a first sample group made up of the odd numbered samples and a second sample group made up of the even numbered samples by a predetermined time, encoding means for encoding delayed samples obtained from the first delay means and undelayed samples obtained directly from the odd/even sample separating means for every one field or one frame and for producing an encoded digital audio signal, second recording and reproducing means for recording and reproducing the encoded digital audio signal on and from the tracks of the magnetic tape, where each track is recorded with the video information signal and the encoded digital audio signal respectively amounting to one field of the input video signal by recording the video information signal and the encoded digital audio signal in mutually different layer portions of a magnetic layer of the magnetic tape or by time-divisionally recording the video information signal and the encoded digital audio signal on the magnetic tape, decoding means for decoding the encoded digital audio signal reproduced by the second recording and reproducing means and for producing the delayed samples and the undelayed samples, second delay means for delaying the undelayed samples from the decoding means by the predetermined time, and audio signal producing means comprising means for producing a reproduced digital audio signal from the delayed samples obtained from the decoding means and delayed samples obtained from the second delay means and means for producing a reproduced analog audio signal by subjecting the reproduced digital audio signal to a digital-to-analog conversion. According to the system of the present invention, the audio information is recorded as an approximately continuous signal at a joint of a previous recording and a new recording when an assembly editing or an insert recording is carried out, and the generation of a click noise at the joint is considerably reduced compared to the conventional system.

Still another object of the present invention is to provide a magnetic recording and reproducing apparatus comprising first video signal processing means for subjecting an input video signal in conformance with a standard television system to a predetermined signal processing and for producing a video information signal having a predetermined signal format suited for magnetic tape recording and reproduction, first recording and reproducing means for recording and reproducing the video information signal on and from tracks formed obliquely to a longitudinal direction of a magnetic tape, second video signal processing means for subjecting the video information signal reproduced by the first recording and reproducing means to a predetermined signal processing and for producing a reproduced video signal in conformance with the standard television system, converting means for sampling an input analog audio signal and for producing a digital audio signal, odd-/even sample separating means for separating samples constituting the digital audio signal into odd numbered samples and even numbered samples within each field of the input video signal by assigning consecutive numbers to the samples which are sequentially obtained by the sampling in the converting means, first delay means for delaying one of a first sample group made up of the odd numbered samples and a second sample group made up of the even numbered samples by a predetermined time which is shorter than a time period of one field, encoding means for encoding delayed samples obtained from the first delay means and undelayed samples obtained directly from the odd/even sample separating means for every one field or one frame and for producing an encoded digital audio signal by adding an identification signal including a fade control signal for each track or each pair of tracks on the magnetic tape, second recording and reproducing means for recording and reproducing the encoded digital audio signal on and from the tracks of the magnetic tape, where each track is recorded with the video information signal and the encoded digital audio signal respectively amounting to one field of the input video signal by recording the video information signal and the encoded digital audio signal in mutually different layer portions of a magnetic layer of the magnetic tape or by time-divisionally recording the video information signal and the encoded digital audio signal on the magnetic tape, decoding means for decoding the encoded digital audio signal reproduced by the second recording and reproducing means and for producing the delayed samples and the undelayed samples, second delay means for delaying the undelayed samples from the decoding means by the predetermined time, and audio signal producing means comprising means for producing a reproduced digital audio signal from the delayed samples obtained from the decoding means and delayed samples obtained from the second delay means by cross fading the samples reproduced from a certain track or pair of tracks for said predetermined time from a start of the certain track or pair of tracks and the samples reproduced from a track or pair of tracks immediately preceding said certain track or pair of tracks for said predetermined time until an end of the track or pair of tracks responsive to the fade control signal in the identification signal and means for producing a reproduced analog audio signal by subjecting the reproduced digital audio signal to a digital-to-analog conversion. According to the system of the present invention, the audio information is recorded as a perfectly continuous signal at a joint of a previous recording and a new recording when an assembly editing or an insert recording is carried out, and the generation of a click noise at the joint is prevented.

Other objects and further features of the present invention will be apparent from the following detailed description when read in conjunction with the accompanying drawings.

BRIEF DESCRIPTION OF THE DRAWINGS

FIG. 1 shows an example of the waveform of a reproduced analog audio signal at a joint of a previous recording and a new recording for explaining the click noise generated in the conventional magnetic recording and reproducing system;

FIGS. 3A and 3B show embodiments of frequency spectrums of signals recorded on a magnetic tape by the system according to the present invention;

FIGS. 5A and 5B are diagrams for explaining the relationship between the digital audio signal and tracks which are formed on the magnetic tape;

FIGS. 9(A) and 9(B) are diagrams for explaining the code format shown in FIG. 8(B);

DETAILED DESCRIPTION

FIG. 1 shows an example of the waveform of a reproduced analog audio signal at a joint J of a previous recording and a new recording for the case where an assembly editing or an insert recording is carried out in the conventional magnetic recording and reproducing system. As described before and clearly shown in FIG. 1, a click noise is generated at the joint J. The object of the present invention is to substantially eliminate this click noise.

Figure 2:
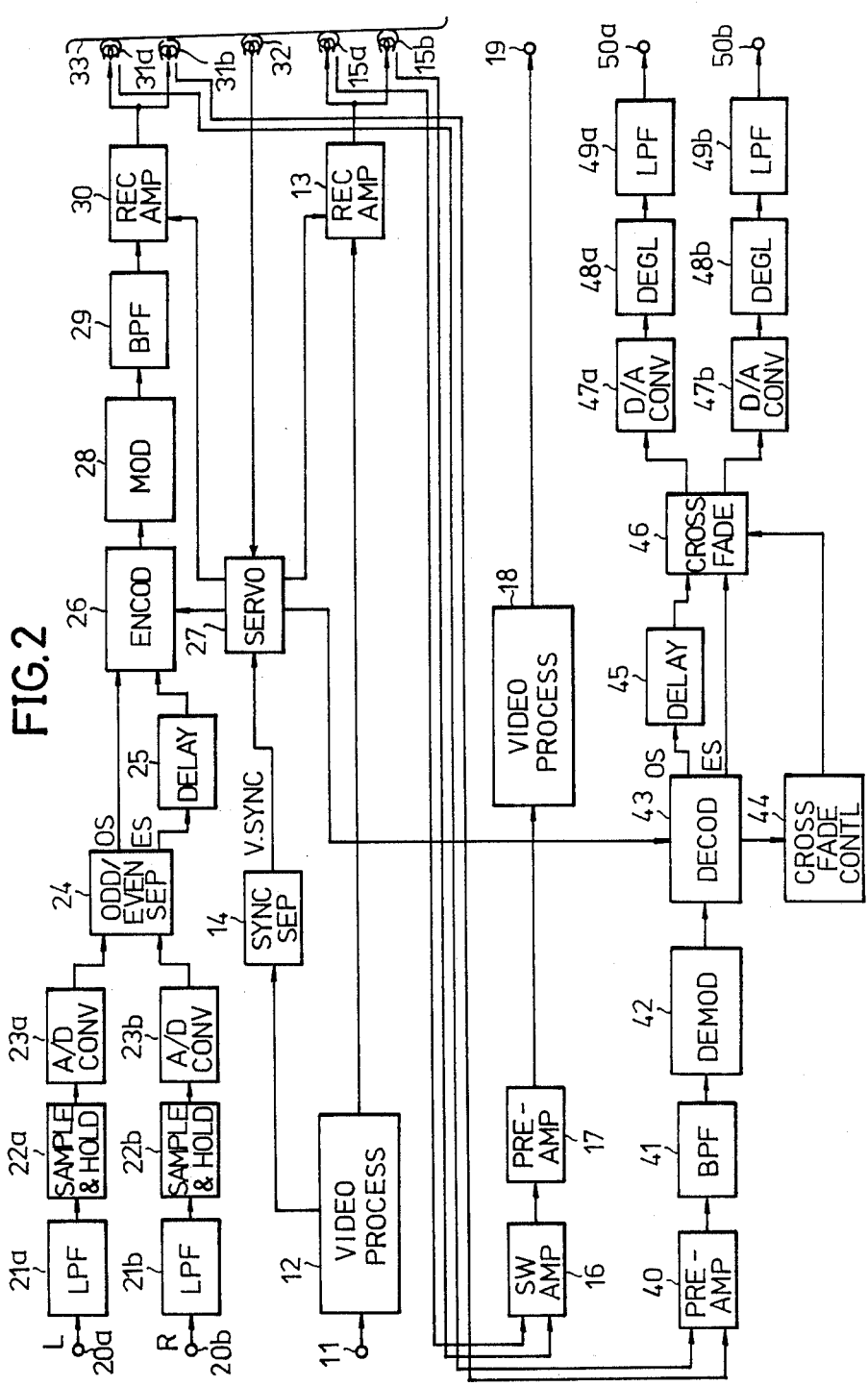
FIG. 2 is a system block diagram showing an embodiment of an apparatus applied with the magnetic recording and reproducing system according to the present invention.

FIG. 2 shows an embodiment of an apparatus applied with the magnetic recording and reproducing system according to the present invention. A color video signal in conformance with a standard color system is applied to an input terminal 11 and is supplied to a video signal processing circuit 12. The processing circuit 12 separates the color video signal into a luminance signal and a carrier chrominance signal, frequency-modulates the luminance signal, frequency-converts the carrier chrominance signal into a frequency range lower than that of the frequency modulated (FM) luminance signal, and produces a frequency division multiplexed signal of the FM luminance signal and the frequency converted carrier chrominance signal. The processing circuit 12 itself is known, and the frequency division multiplexed signal from the processing circuit 12 has a frequency spectrum shown in FIG. 3A. In FIG. 3A, the FM luminance signal I has a carrier frequency band of 3.4 MHz to 4.4 MHz, and the frequency converted carrier chrominance signal II has a converted center frequency of approximately 629 kHz.

The frequency division multiplexed signal from the processing circuit 12 is supplied to rotary video heads 15a and 15b via a recording amplifier 13, and is recorded on a magnetic tape 33 so that video information amounting to one field is recorded on each track formed obliquely to a longitudinal direction of the magnetic tape 33. The processing circuit 12 also supplies the color video signal which is in conformance with the standard color system to a synchronizing signal separating circuit 14. The separating circuit 14 separates a vertical synchronizing signal from the color video signal and supplies the vertical synchronizing signal to a servo circuit 27 which will be described later.

Right and left channel analog audio signals are respectively applied to input terminals 20b and 20a. The right and left analog audio signals are respectively passed through lowpass filters 21b and 21a wherein an unwanted high-frequency component exceeding an audio frequency band is eliminated. Output audio signals of the lowpass filters 21a and 21b are respectively supplied to analog-to-digital (A/D) converters 23a and 23b via respective sample and hold circuits 22a and 22b having a sampling frequency of 48 kHz, for example, and are converted into digital signals constituted by 16-bit samples. Right and left digital audio signals from the A/D converters 23b and 23a are supplied to an odd/even sample separating circuit 24.

When consecutive numbers are assigned to the samples constituting the right and left channel digital signals in the sampled sequence within one field of the video signal, the odd/even sample separating circuit 24 separates the samples constituting the right and left channel digital signals into odd numbered samples OS and even numbered samples ES (hereinafter simply referred to as odd samples OS and even samples ES). The even samples ES are supplied to a delay circuit 25, and the odd samples OS are supplied to an encoder 26. The delay circuit 25 delays the even samples ES by a delay time dl and supplies the delayed even samples to the encoder 26, where the delay time dl is several fractions of one field, for example.

Figure 4:
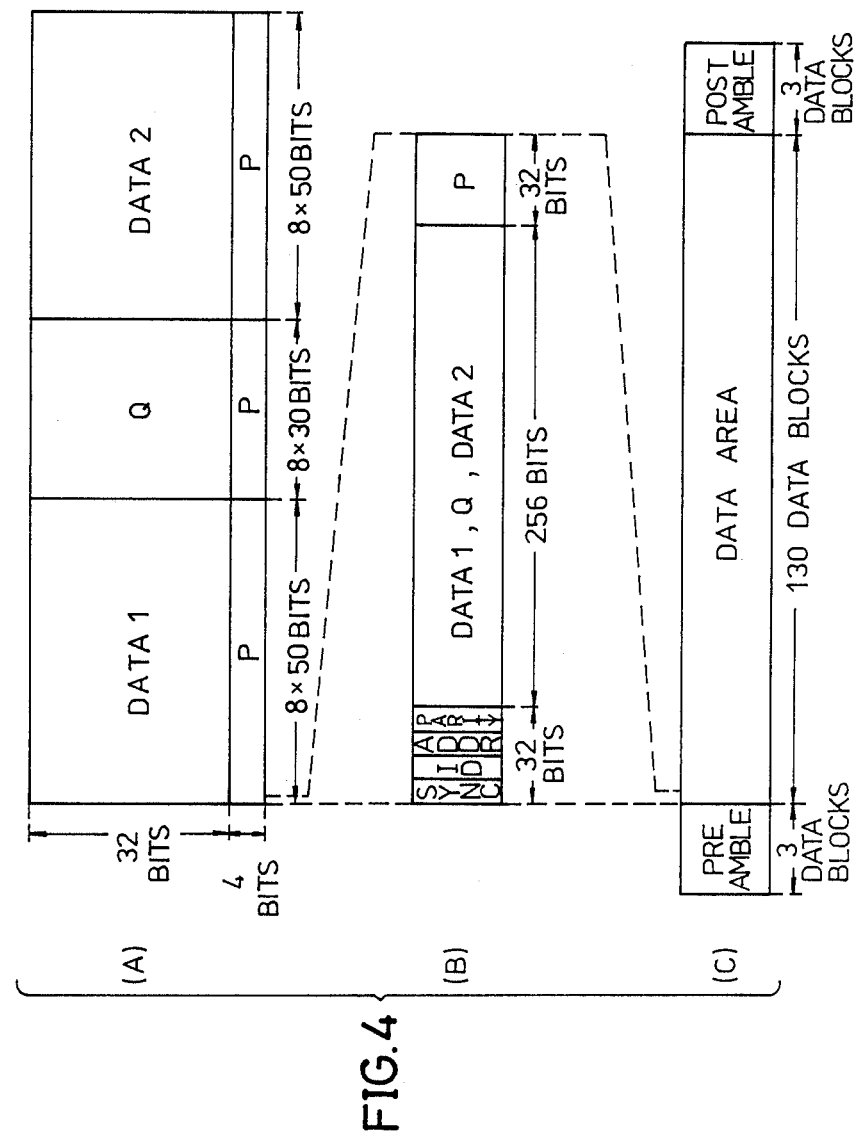
FIGS. 4(A) through 4(C) are diagrams for explaining an embodiment of a signal format of a digital audio signal which is recorded and reproduced in the system according to the present invention.

Every time the odd samples OS of the present field, the even samples ES of a portion of the previous field and the even samples ES of a large portion of the present field are supplied to the encoder 26, the encoder 26 produces error check and correction codes P and Q having a format shown in FIG. 4(A) from these odd and even samples OS and ES amounting to one field. In FIG. 4(A), the even samples ES constitute a datum DATA1 and the odd samples OS constitute a datum DATA2, for example. The parity Q in units of words having 8×30 bits per row is produced by carrying out a predetermined operation on the data DATA1 and DATA2 in units of words (one word corresponds to upper or lower 8 bits of each sample) in the horizontal direction having 8×50 bits per row. The parity P in units of words having 8×4 bits per column is produced by carrying out a predetermined operation on the data DATA1 and DATA2 in units of words in the vertical direction having 32 bits per column and the parity Q.

The data DATA1 and DATA2 and the parities P and Q are divided into every 36 words and a data block shown in FIG. 4(A) is formed. In FIG. 4(B), an 8-bit synchronizing signal SYNC, an 8-bit identification signal ID, an 8-bit address signal ADDR and an 8-bit block parity signal PARITY are added before the 32 words of the datum DATA1, parity Q or datum DATA2 and the 4 words of the parity P. For example, upper 2 bits of the 8-bit identification signal ID constitute a cross fade control signal. For example, the cross fade control signal instructs a normal recording when the 2 bits have a value "00", a start of a recording when the 2 bits have a value "11", and an end of a recording when the 2 bits have a value "10".

The address signal ADDR instructs the sequence of each data block within the digital audio signal (that is, 130 data blocks) amounting to one track. The block parity signal PARITY is an error check signal obtained by an operation PARITY=ID $\oplus$ ADDR, where the symbol "$\oplus$" denotes a modulo-2 addition. The data DATA1 and DATA2 and the parities P and Q are transmitted in a data area shown in FIG. 4(C) having 130 data blocks, but a preamble signal and a post amble signal are respectively added before and after the data area for reproducing clock signals amounting to 3 data blocks. Accordingly, the digital audio signal is transmitted in 136 data blocks (=43520 bits) in one field ($\approx$ 1/60 sec in the case of the NTSC system) of the video signal.

An encoded digital audio signal from the encoder 26 is supplied to a 4-phase differential phase shift keying (DPSK) modulator 28. The 4-phase DPSK modulator 28 comprises a code converting circuit (not shown) for converting the incoming serial digital audio signal into parallel data and for subjecting the parallel data to a predetermined differential conversion, two balanced modulator circuits (not shown) for independently balance-modulating carriers having a mutual phase difference of 90° by the two parallel output signals of the code converting circuit obtained via a lowpass filter (not shown), and a circuit (not shown) for adding output signals of the two balanced modulator circuits so as to produce a digital audio signal which has been subjected to a 4-phase DPSK modulation. The carrier frequencies of the carriers are desirably selected to an integral multiple of a horizontal scanning frequency $f_H$, and for example, the carrier frequencies are selected to 127 times the horizontal scanning frequency $f_H$ (that is, approximately 2.00 MHz in the case of the NTSC system). In addition, the transmission rate (recording bit rate) of the digital audio signal is selected to 2.6086 Mb/sec.

Hence, an output digital audio signal of the 4-phase DPSK modulator 28 has a known frequency spectrum which is shaped like the teeth of a comb and in which a maximum level occurs at the carrier frequency of 2.00 MHz, a zero level occurs at frequencies 1.30 MHz (=2.6086 MHz/2) plus or minus 2.00 MHz, and a zero level similarly occurs at frequencies of 2.00 MHz$\pm$n$\times$1.30 MHz, where n is a natural number.

The output digital audio signal of the 4-phase DPSK modulator 28 is supplied to a bandpass filter 29 which limits the frequency band so as to eliminate an unwanted frequency component. The bandpass filter 29 has a passband of approximately 0.7 times the transmission rate about the center frequency of 2.00 MHz, so as not to generate an inter-symbol interference. Therefore, a digital audio signal having a frequency spectrum III shown in FIG. 3B is obtained from the bandpass filter 29 and is supplied to rotary audio heads 31a and 31b via a recording amplifier 30.

According to the 4-phase DPSK modulation, one of four kinds of information is transmitted in one of four phases, and the phase modulation need only be carried out once for 2 bits. As a result, the switching speed of the carrier phase (that is, the symbol rate) need only be ½ the transmission rate. Thus, the information can be transmitted in the frequency band corresponding to the transmission rate, and this frequency band may be narrow in the order of 1.7 MHz.

The rotary video heads 15a and 15b are mounted on a rotary drum (not shown) at positions having an angular separation of 180° on a rotational plane of the rotary drum. The rotary audio heads 31a and 31b are also mounted on the rotary drum at positions having an angular separation of 180° on the rotational plane of the rotary drum, and the positions of the rotary audio heads 31a and 31b respectively lead the rotary video heads 15a and 15b by 120° in a rotating direction of the rotary drum.

The servo circuit 27 supplies the vertical synchronizing signal from the separating circuit 14 to the encoder 26 so as to obtain field synchronization in the encoder 26. The servo circuit 27 also supplies the vertical synchronizing signal to a driving circuit (not shown) so that a drum motor (not shown) for rotating the rotary drum is driven by the driving circuit in synchronism with the vertical synchronizing signal. The rotary audio heads 31a and 31b respectively record the digital audio signal having the codes which are completed in each track by saturation recording in a deep layer portion of a magnetic layer of the magnetic tape 33. Thereafter, the rotary video heads 15a and 15b record the video signal in a surface layer portion of the magnetic layer of the magnetic tape 33. The rotary video heads 15a and 15b of course have gaps with azimuth angles different from those of the rotary audio heads 31a and 31b. The servo circuit 27 also produces a control signal from the vertical synchronizing signal and supplies the control signal to a stationary head 32. The stationary head 32 records the control signal on and from a control track of the magnetic tape 33.

When the analog audio signal indicated by a solid line A in FIG. 5A is sampled in units of one field, the samples obtained consist of the odd samples OS and the even samples ES. Out of the odd samples OS obtained in a field F1 between times t0 and t1, the odd samples obtained for the time dl from the start of the field F1 will be denoted by O1a and the odd samples obtained thereafter in the remaining portion of the field F1 will be denoted by O1b. Similarly, out of the odd samples OS obtained in a field F2 between times t1 and t2, the odd samples obtained for the time dl from the start of the field F2 will be denoted by O2a and the odd samples obtained thereafter in the remaining portion of the field F2 will be denoted by O2b. On the other hand, out of the even samples ES obtained in the field F1, the even samples obtained for the time dl from the start of the field F1 will be denoted by E1a and the even samples obtained thereafter in the remaining portion of the field F1 will be denoted by E1b. Similarly, out of the even samples ES obtained in the field F2, the even samples obtained for the time dl from the start of the field F2 will be denoted by E2a and the even samples obtained thereafter in the remaining portion of the field F2 will be denoted by E2b.

In FIG. 5B, the magnetic tape 33 is transported in a direction C and is scanned by the rotary audio heads 31a and 31b which scan in a direction B and form audio tracks T1, T2, . . . . In this case, a digital audio signal constituted by the samples E1a, E1b, O1b and O2a is recorded on the audio track T1, and a digital audio signal constituted by the samples E2a, E2b, O2b and O3a is recorded on the audio track T2. In FIG. 5B, Tc denotes the control track for the control signal described before.

During a reproducing mode, signals reproduced by the rotary audio heads 31a and 31b from the deep layer portion of the magnetic tape 33 are supplied to a pre-amplifier 40, and signals reproduced by the rotary video heads 15a and 15b from the surface layer portion of the magnetic tape 33 are supplied to a switching amplifier 16. The control signal reproduced by the stationary head 32 from the control track Tc of the magnetic tape 33 is supplied to the servo circuit 27. The servo circuit 27 controls the driving circuit described before and the rotary drum is controlled so that the reproduced control signal is synchronized to a reference frequency signal.

The switching amplifier 16 amplifies the reproduced signals from the rotary video heads 15a and 15b and also carries out a switching so as to obtain a continuous reproduced signal. The continuous reproduced signal from the switching amplifier 16 is supplied to a video signal processing circuit 18 via a pre-amplifier 17. The processing circuit 18 separates the continuous reproduced signal into the FM luminance signal and the frequency converted carrier chrominance signal, frequency-demodulates the FM luminance signal, frequency-converts the frequency converted carrier chrominance signal back into the original frequency band, and produces a color video signal which is in conformance with the standard color system and comprises the luminance signal and the carrier chrominance signal. The processing circuit 18 itself is known, and the reproduced color video signal from the processing circuit 18 is outputted via an output terminal 19.

The pre-amplifier 40 amplifies the reproduced signals from the rotary audio heads 31a and 31b and also carries out a switching so as to obtain a continuous reproduced signal. This continuous reproduced signal is supplied to a bandpass filter 41 wherein a reproduced signal having the frequency spectrum shown in FIG. 3B is separated, and this separated reproduced signal is supplied to a 4-phase DPSK demodulator 42. The 4-phase DPSK demodulator 42 carries out a 4-phase DPSK demodulation on the reproduced signal from the bandpass filter 41 and supplies a demodulated digital audio signal to a decoder 43.

The decoder 43 is also supplied with a vertical synchronizing signal from the servo circuit 27 which produces this vertical synchronizing signal in synchronism with the reproduced control signal. The decoder 43 carries out processings such as de-interleaving, error correction, jitter compensation and time base expansion, and independently outputs the samples ES and OS in units of one field. In addition, the cross fade control signal in the identification signal ID is obtained in the decoder 43 and is supplied to a cross fade control circuit 44. The odd samples OS from the decoder 43 are supplied to a delay circuit 45 wherein the odd samples OS are delayed by the delay time dl, and the delayed odd samples are supplied to a cross fader 46. On the other hand, the even samples ES from the decoder 43 are supplied directly to the cross fader 46. Accordingly, during a time period in which the samples E2a and E2b reproduced from the audio track T2 are supplied to the cross fader 46, for example, the samples 02a and 02b reproduced from the audio tracks T1 and T2 are supplied to the cross fader 46, and the timings of the samples ES and OS are matched.

The cross fader 46 is controlled responsive to a control signal from the cross fade control circuit 44. In the case where the value of the reproduced cross fade control signal is "00", the cross fader 46 arranges the odd samples OS and the even samples ES in a sequence identical to that at the time of the analog-to-digital conversion carried out in the A/D converters 13a and 13b without cross fading the samples ES and OS, and separates the digital audio signal into the right channel digital audio signal and the left channel digital audio signal.

The right and left channel digital audio signals from the cross fader 46 are respectively supplied to digital-to-analog (D/A) converters 47b and 47a and are converted into right and left channel analog audio signals. The right and left channel analog audio signals from the D/A converters 47b and 47a are respectively passed through deglitcher circuits 48b and 48a for eliminating a noise component which is generated during the digital-to-analog conversion. Output signals of the deglitcher circuits 48a and 48b are respectively passed through lowpass filters 49a and 49b for eliminating an unwanted high-frequency component exceeding the audio frequency band, and reproduced right and left channel analog audio signals are outputted via output terminals 50b and 50a.

Next, description will be given with respect to an assembly editing in which a pre-recorded magnetic tape is played and new video and digital audio signals are newly recorded from a desired track of the pre-recorded magnetic tape and an insert recording in which new video and digital audio signals are recorded on tracks existing between two desired tracks of the pre-recorded magnetic tape.

During an assembly editing mode and an insert recording mode, the pre-recorded magnetic tape 33 is played and the rotary drum is rotated in synchronism with the reproduced control signal by the operation of the servo circuit 27. The reproduced video signal is obtained from the output terminal 19, and the reproduced audio signals are obtained from the output terminals 50a and 50b. Furthermore, the new video signal and the new audio signals which are to be recorded are applied to the input terminals 11, 20a and 20b, respectively. However, the recording amplifiers 13 and 30 are controlled by a control signal from the servo circuit 27 so as not to produce an output.

When the operation mode is changed to the recording mode in this state, the servo circuit 27 controls the rotation of the rotary drum in synchronism with the vertical synchronizing signal from the separating circuit 14. When the rotation of the rotary drum is synchronized, the encoder 26 sets the value of the fade control signal in the identification signal ID to "11" only for the one track where the recording is started. Thereafter, the encoder 26 carries out the encoding by setting the value of the fade control signal to "00", and the recording amplifier 30 starts to produce an output responsive to the control signal from the servo circuit 27. A new digital audio signal obtained in this manner is recorded in the deep layer portion of the pre-recorded magnetic tape 33 by the rotary audio heads 31a and 31b. In addition, after the rotary drum rotates 120° from a time when the rotary audio head 31a (or 31b) starts to record the digital audio signal in which the value of the fade control signal is set to "11", the recording amplifier 13 starts to produce an output responsive to the control signal from the servo circuit 27, and the rotary video heads 15a and 15b start to record the new video signal in the surface layer portion of the pre-recorded magnetic tape 33.

In the assembly editing mode, the value of the fade control signal in the digital audio signal is set to "00" and the recording of the new digital audio signal is thereafter carried out to the end. On the other hand, in the insert recording mode, the new digital audio signal is recorded so that the value of the fade control signal is set to "10" only in one track where the recording ends. When the rotary audio head 31a (or 31b) finishes recording the digital audio signal in which the value of the fade control signal is set to "10", the servo circuit 27 controls the recording amplifier 30 so that the recording amplifier 30 stops producing an output. As a result, after the rotary drum rotates 120°, the servo circuit 27 controls the recording amplifier 13 so that the recording amplifier 13 stops producing an output, and the recording of the new digital audio signal and video signal is stopped.

In the assembly editing mode, a new control signal is recorded on the pre-recorded magnetic tape 33 by the stationary head 32, but no new control signal is recorded in the insert recording mode.

The assembly recording and the insert recording may be started according to one of first and second methods. According to the first method, the operation mode is switched from the reproducing mode to the recording mode. On the other hand, according to the second method (so-called back-space editing), a recording is first carried out in the recording mode, the operation mode is once changed to a stop mode or a pause mode, and the operation mode is thereafter changed to the recording mode. In the latter case, the pre-recorded magnetic tape 33 is rewound for a small distance during the stop mode or the pause mode, and the recording is started after reproducing the pre-recorded portion of the pre-recorded magnetic tape 33 for the small distance and synchronizing the rotation of the rotary drum to the reproduced control signal.

Figure 6:
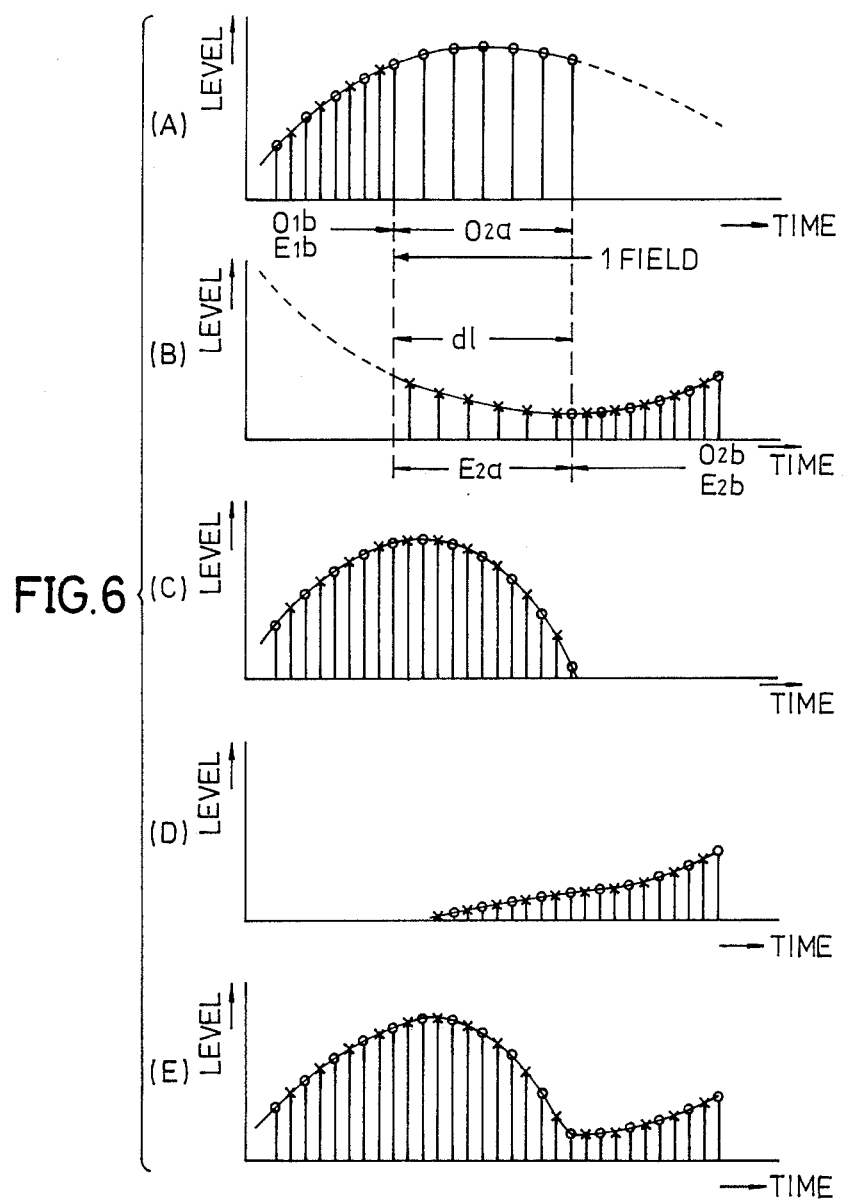
FIGS. 6(A) through 6(E) are diagrams for explaining the reproduction of the audio signal at a joint of two audio signals.

With regard to the digital audio signal, it will now be assumed that the audio track T1 shown in FIG. 5B is formed by the previous recording and the audio track T2 and the following audio tracks are newly recorded by the assembly editing or the insert recording. In other words, the value of the fade control signal in the identification signal ID is "11" in the audio track T2. Hence, in the reproducing mode, samples corresponding to a waveform shown in FIG. 6(A) are reproduced from the audio track T1, and samples corresponding to a waveform shown in FIG. 6(B) are reproduced from the audio track T2. These reproduced samples are supplied to the cross fader 46. In FIGS. 6(A) through 6(E), the odd samples OS are indicated by circular marks "o" and the even samples ES are indicated by crosses "x".

The cross fader 46 which is controlled by the cross fade control circuit 44 carries out the following operations when the value of the cross fade control signal in the identification signal ID is "11". In the time period dl from the start of the field F2, for example, the samples O2a are subjected to a mean value interpolation (first order interpolation) or a previous value holding (zero'th order interpolation) so as to produce pseudo even samples es, a coefficient α is multiplied to the samples O2a and es, and samples corresponding to a waveform shown in FIG. 6(C) are obtained. The value of the coefficient α gradually changes from "1" to "0" in the time period dl. On the other hand, the samples E2a are subjected to a mean value interpolation or a previous value holding so as to produce pseudo odd samples os, a coefficient $(1-\alpha)$ is multiplied to the samples E2a and os, and samples corresponding to a waveform shown in FIG. 6(D) are obtained. The samples shown in FIGS. 6(C) and 6(D) are added and a cross fade is carried out so as to obtain samples corresponding to a waveform shown in FIG. 6(E).

Accordingly, the reproduced analog audio signal of the previously recorded audio signal and the reproduced audio signal of the newly recorded audio signal are continuous in the reproduced analog audio signals obtained from the output terminals 50a and 50b, and no click noise is generated at a joint where the previous recording ends and the new recording in the assembly editing mode or the insert recording mode starts.

In the case where the value of the cross fade control signal is "10", the cross fader 46 carries out the following operations. In the time period dl up to the end of one field, the odd samples OS are subjected to a mean value interpolation or a previous value holding so as to produce pseudo even samples es, a coefficient $\alpha$ is multiplied to the samples OS and es, and first samples are obtained. The value of the coefficient $\alpha$ gradually changes from "1" to "0" in the time period dl. On the other hand, the even samples ES are subjected to a mean value interpolation or a previous value holding so as to produce pseudo odd samples os, a coefficient $(1-\alpha)$ is multiplied to the samples ES and os, and second samples are obtained. The first and second samples are added and a cross fade is carried out. As a result, the reproduced analog audio signal of the newly recorded audio signal and the reproduced audio signal of the previously recorded audio signal are continuous in the reproduced analog audio signals obtained from the output terminals 50a and 50b, and no click noise is generated at a joint where the new recording in the insert recording mode ends and the previous recording starts.

Figure 7:
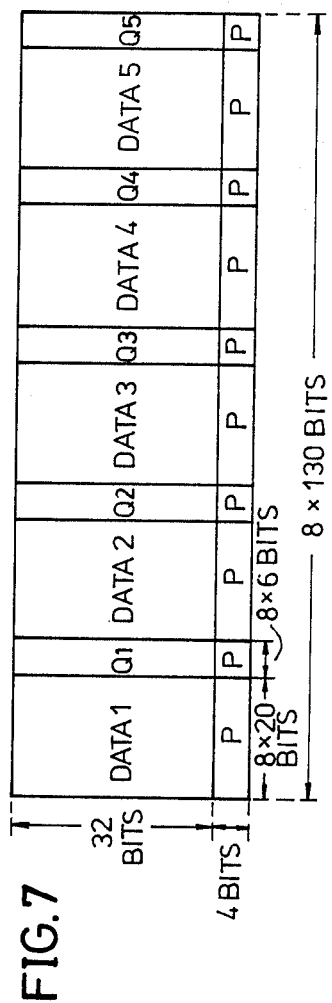
FIG. 7 is a diagram for explaining another embodiment of the code format of the digital audio signal.
Figure 8:
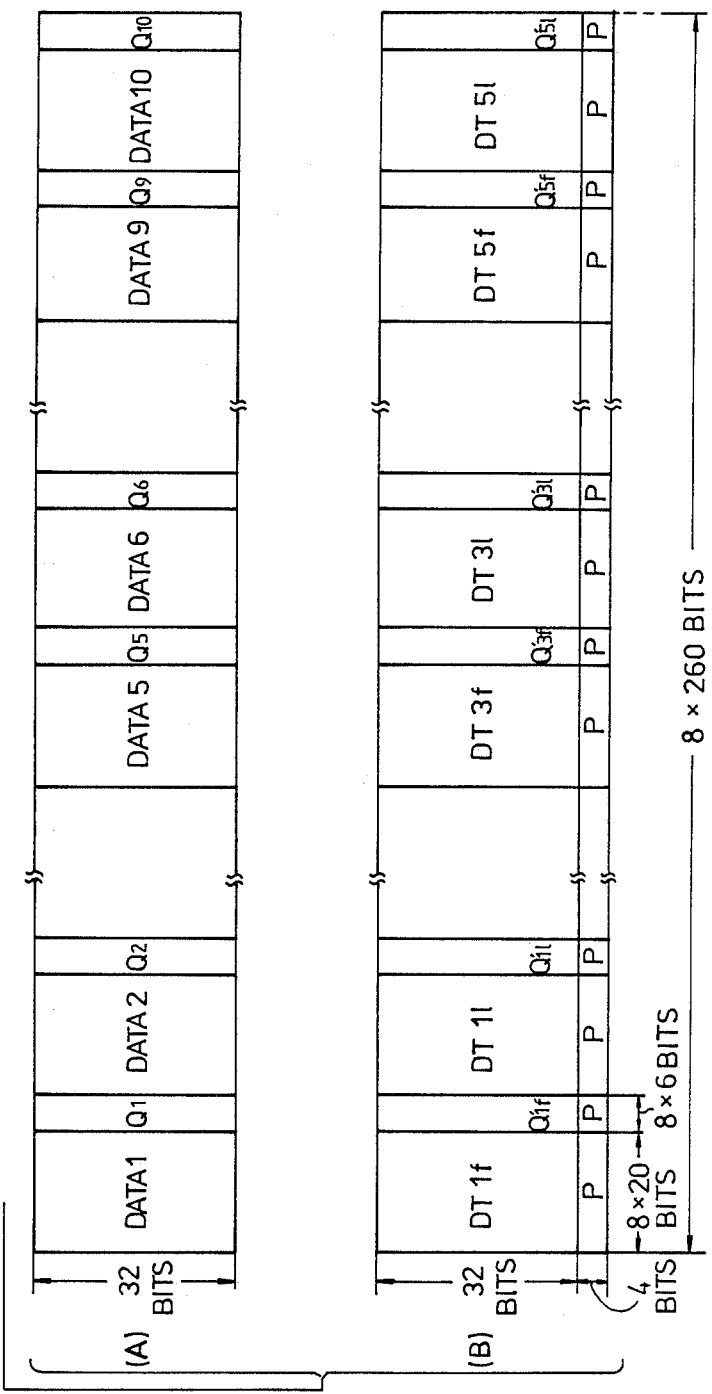
FIGS. 8(A) and 8(B) are diagrams for explaining still another embodiment of the code format of the digital audio signal.

It is possible to use the code format shown in FIG. 7 or FIGS. 8(B) instead of the code format shown in FIGS. 4(A). In the embodiment of the code format shown in FIG. 7, the samples ES and OS amounting to one field and comprising even samples (or odd samples) which are delayed by a specific delay time and the odd samples (or even samples) which are not delayed are divided in time into 5 groups. An interleaving is carried out within each of the 5 divided groups in units of words so as to successively obtain data DATA1, DATA2, DATA3, DATA4 and DATA5. Parities Q1 through Q5 in units of words having 8×6 bits per row are produced for the respective data DATA1 through DATA5. A parity P in units of words having 8×4 bits per column is produced for each of the data DATA1 through DATA5 and the parities Q1 through Q5. Blocks are formed from the data DATA1 through DATA5 and the parities Q1 through Q5 and P similarly as in the case shown in FIG. 4(B), and a preamble and a post amble such as those shown in FIG. 4(C) are added before and after a predetermined number of such blocks when transmitting the information. In this case, since the codes are completed five times within each field, it is possible to reduce the time delay of the digital audio signal with respect to the video signal caused by the encoding and decoding. For this reason, this code format is preferable from the point of view of carrying out a dub-recording and the like, but on the other hand, the correctable burst error length becomes small.

In the embodiment of the code format shown in FIGS. 8(A) and 8(B), the samples ES and OS amounting to one frame (that is, two fields) and comprising even samples (or odd samples) which are delayed by a specific delay time and the odd samples (or even samples) which are not delayed are divided in time into 10 groups. An interleaving is carried out within each of the 10 divided groups in units of words so as to successively obtain data DATA1 through DATA10. Parities Q1 through Q10 in units of words having 8×6 bits per row are produced for the respective data DATA1 through DATA10. Next, data amounting to one column (32 words) are alternately obtained from the data DATA1 and DATA2 so as to successively constitute data DT1$f$ and DT1$l$ shown in FIG. 8(B). As shown in FIGS. 9(A) and 9(B), data d1-1 through d1-32, d1-33 through d1-64, ... in units of columns from the data DATA1 and data d2-1 through d2-32, d2-33 through d2-64, ... in units of columns from the data DATA2 are alternately arranged within the respective data DT1$f$ and DT1$l$. Similarly, data DT2$f$ and DT2$l$ are formed from the data DATA3 and DATA4, ..., and data DT5$f$ and DT5$l$ are formed from the data DATA9 and DATA10. Parities Q'1$f$, Q'1$l$, Q'2$f$, Q'2$l$, ..., Q'5$f$, Q'5$l$ are formed similarly. That is, the parities Q'1$f$ and Q'1$l$ are formed from the parities Q1 and Q2, ..., and the parities Q'5$f$ and Q'5$l$ are formed from the parities Q9 and Q10. Further, a parity P in units of words having 8×4 bits per column is produced for each of the data DT1$f$ through DT5$l$ and the parities Q'1$f$ through Q'5$l$. A code format shown in FIG. 8(B) is formed from the data DT1$f$ through DT5$l$ and the parities Q'1$f$ through Q'5$l$ and P, similarly as in the case shown in FIG. 7.

A block similar to that shown in FIG. 4(B) is obtained by adding the synchronizing signal SYNC, identification signal ID, the address signal ADDR and the block parity signal PARITY to the signal shown in FIG. 8(B). In addition, a preamble and a post amble such as those shown in FIG. 4(C) are added before and after a predetermined number of such blocks comprising the data DT1$f$ through Q'3$f$ of the first half and before and after a predetermined number of such blocks comprising the data DT3$l$ through Q'5$l$ of the latter half when transmitting the information. As a result, the data DT1$f$ through Q'3$f$ of the first half and the data DT3$l$ through Q'5$l$ of the latter half are recorded on a pair of tracks of the magnetic tape 33.

In the case of the code format shown in FIG. 8(B), the delay time caused by the encoding and decoding is large when compared with that of the code format shown in FIG. 7. Further, in the code format shown in FIG. 8(B), the blocks at the end of the first field within one frame and the blocks at the start of the second field within the frame respectively include the data DATA5 and DATA6 and the parities Q5 and Q6 and P produced therefrom. For this reason, the codes are completed in one frame, and the editing such as the assembly editing and insert recording must be controlled so that the editing is carried out in units of frames (that is, in units of pairs of tracks).

Figure 10:
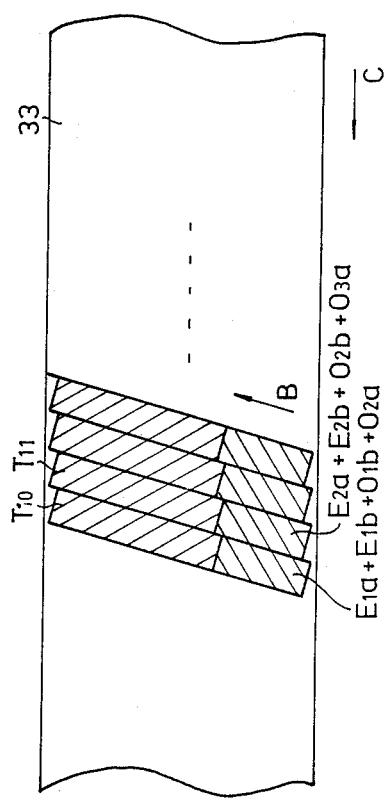
FIG. 10 shows another embodiment of the tracks on the magnetic tape recorded with the digital audio signal and the video signal.

Next, description will be given with respect to another embodiment of the tracks formed on the magnetic tape. Instead of recording the digital audio signal in the deep layer portion of the magnetic tape 33 by the rotary audio heads 31a and 31b, it is possible to increase the angular range for which the magnetic tape 33 is wrapped obliquely around the peripheral surface of the rotary drum and time-divisionally record the digital audio signal and the video signal by the rotary video heads 15a and 15b. In this case, as shown in FIG. 10, the digital audio signal is recorded in a portion of oblique tracks T10, T11, ... indicated by rightwardly inclining hatchings and the video signal is recorded in a remaining portion of the oblique tracks T10, T11, ... indicated by leftwardly inclining hatchings. As in the case shown in FIG. 5B, the oblique track T10 is recorded with the digital audio signal comprising the samples E1a, E1b, O1b and O2a, and the oblique track T11 is recorded with the digital audio signal comprising the samples E2a, E2b, O2b and O3a. Further, no control track is formed on the magnetic tape 33 in this case, and for example, the tracking control is carried out by use of four kinds of pilot signals which have mutually different frequencies and are successively recorded on the oblique tracks.

In the embodiment described heretofore, the system employs the 4-phase DPSK, but the system may employ other modulation systems such as the 4-phase phase shift keying (PSK) and the offset 4-phase DPSK. It is possible to transmit the information in a narrow frequency band as in the case of the 4-phase DPSK when the 4-phase PSK or the offset 4-phase DPSK is employed. The 4-phase PSK and the offset 4-phase DPSK both transmit the information in four phases, as in the case of the 4-phase DPSK. According to the 4-phase DPSK, there is no fixed reference phase for determining the correspondence of the carrier phase and the codes and the correspondence of the carrier phase and the codes is determined by the change in the phase with reference to the immediately preceding carrier phase. On the other hand, according to the 4-phase PSK, the correspondence of the carrier phase and the codes is determined by a fixed reference phase. According to the offset DPSK, the two modulated signals obtained by the 4-phase DPSK are shifted by ½ the time slot so that there is no phase jump of 180°, and the constant amplitude stability is improved.

Figure 11:
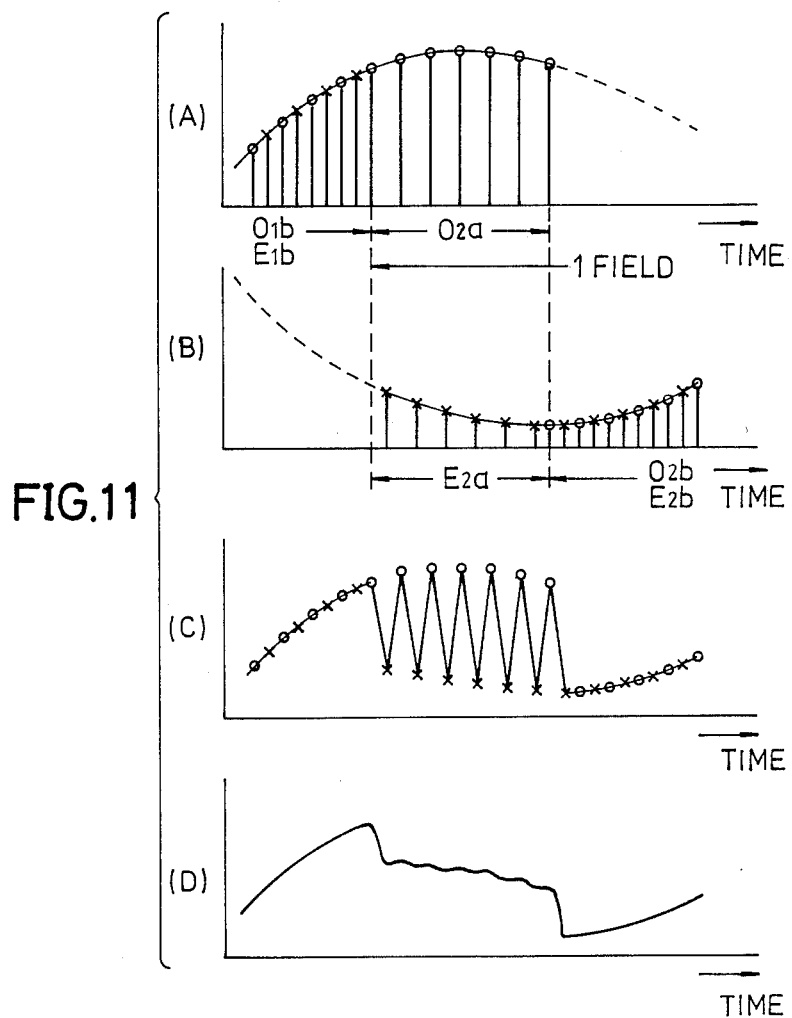
FIGS. 11(A) through 11(D) are diagrams for explaining the reproduction of the audio signal at a joint of two audio signals.

In FIG. 4(B), it is not essential to provide the identification signal ID. In the case where no identification signal ID is provided and the assembly editing or insert recording is carried out, the samples corresponding to the waveform shown in FIG. 11(A) are reproduced from the track T1 shown in FIG. 5B, the samples corresponding to the waveform shown in FIG. 11(B) are reproduced from the track T2 shown in FIG. 5B, and these reproduced samples are supplied to the cross fader 46. Since there is no identification information, the cross fader 46 obtains the samples corresponding to the waveform shown in FIG. 11(C) and supplies these samples to the D/A converters 47a and 47b. The high-frequency component of the reproduced audio signal is eliminated in the lowpass filters 49a and 49b, and the reproduced audio signal having the waveform shown in FIG. 11(D) is obtained from the output terminals 50a and 50b. The click noise generated at the joint of the two audio recordings is less than ½ in amplitude and less than ¼ in power compared to the conventional case described before in conjunction with FIG. 1, and the click noise is substantially eliminated.

In this case, there is no need to separate the identification signal ID in the decoder 43 because there is no identification information, and the cross fade control circuit 44 may be omitted. The cross fader 46 simply rearranges the odd and even samples back into the originally sampled sequence. The circuit construction of the apparatus is accordingly simplified and the circuit becomes inexpensive. However, compared to the reproduced audio signal shown in FIG. 11(D), the reproduced audio signal shown in FIG. 6(E) is of course better in that no noise component is included therein.

In the embodiment described heretofore, the right and left channel audio signals are recorded and reproduced as the audio information. However, more than two channels of audio signals may be recorded and reproduced according to the system of the present invention. In addition, in FIG. 2, the odd samples OS may be delayed in the delay circuit 25 instead of the even samples ES, and the even samples ES may be delayed in the delay circuit 45 instead of the odd samples OS.

As described heretofore, according to the system of the present invention, the audio information is recorded as an approximately continuous signal at the joint of the previous recording and the new recording when the assembly editing or the insert recording is carried out, and the generation of the click noise at the joint is substantially eliminated. Moreover, in the case where the cross fading is carried out so that the audio information is recorded as a perfectly continuous signal at the joint of the previous recording and the new recording, it is possible to completely eliminate the click noise at the joint.

Further, the present invention is not limited to these embodiments, but various variations and modifications may be made without departing from the scope of the present invention.

What is claimed is:

1. A magnetic recording and reproducing system comprising:

first video signal processing means for subjecting an input video signal in conformance with a standard television system to a predetermined signal processing and for producing a video information signal having a predetermined signal format suited for magnetic tape recording and reproduction;

first recording and reproducing means for recording and reproducing the video information signal on and from tracks formed obliquely to a longitudinal direction of a magnetic tape;

second video signal processing means for subjecting the video information signal reproduced by said first recording and reproducing means to a predetermined signal processing and for producing a reproduced video signal in conformance with said standard television system;

analog-to-digital converting means for sampling an input analog audio signal and for producing a digital audio signal;

odd/even sample separating means for separating samples constituting said digital audio signal into odd numbered samples and even numbered samples within each field of said input video signal by assigning sequential numbers to the samples which are sequentially obtained by the sampling in said analog-to-digital converting means;

first delay means for delaying one of a first sample group made up of the odd numbered samples and a second sample group made up of the even numbered samples by a predetermined time;

encoding means for encoding delayed samples obtained from said first delay means and undelayed samples obtained from said odd/even sample separating means for every one field and for producing an encoded digital audio signal, said delayed samples being the samples making up said one of the first and second sample groups and having been delayed by said first delay means, said undelayed samples being the samples making up the other one of the first and second sample groups and being obtained directly from said odd/even sample separating means;

second recording and reproducing means for recording and reproducing the encoded digital audio signal on and from the tracks of the magnetic tape, each of said tracks being recorded with the video information signal and the encoded digital audio signal respectively amounting to one field of said input video signal;

decoding means for decoding the encoded digital audio signal reproduced by said second recording and reproducing means and for producing the delayed samples and the undelayed samples;

second delay means for delaying the undelayed samples from said decoding means by said predetermined time; and audio signal producing means comprising means for producing a reproduced digital audio signal from the delayed samples obtained from said decoding means and delayed samples obtained from said second delay means and means for producing a reproduced analog audio signal by subjecting the reproduced digital audio signal to a digital-to-analog conversion.

2. A magnetic recording and reproducing system as claimed in claim 1 in which said video information signal and said encoded digital audio signal are recorded in mutually different layer portions of a magnetic layer of the magnetic tape.

3. A magnetic recording and reproducing system as claimed in claim 1 in which said video information signal and said encoded digital audio signal are recorded time-divisionally in different portions of each track of the magnetic tape.

4. A magnetic recording and reproducing system as claimed in claim 1 in which said predetermined time is shorter than a time period of one field of said input video signal.

5. A magnetic recording and reproducing system comprising:

first video signal processing means for subjecting an input video signal in conformance with a standard television system to a predetermined signal processing and for producing a video information signal having a predetermined signal format suited for magnetic tape recording and reproduction;

first recording and reproducing means for recording and reproducing the video information signal on and from tracks formed obliquely to a longitudinal direction of a magnetic tape;

second video signal processing means for subjecting the video information signal reproduced by said first recording and reproducing means to a predetermined signal processing and for producing a reproduced video signal in conformance with said standard television system;

analog-to-digital converting means for sampling an input analog audio signal and for producing a digital audio signal;

odd/even sample separating means for separating samples constituting said digital audio signal into odd numbered samples and even numbered samples within each field of said input video signal by assigning sequential numbers to the samples which are sequentially obtained by the sampling in said analog-to-digital converting means;

first delay means for delaying one of a first sample group made up of the odd numbered samples and a second sample group made up of the even numbered samples by a predetermined time which is shorter than a time period of one field;

encoding means for encoding delayed samples obtained from said first delay means and undelayed samples obtained from said odd/even sample separating means for every one field and for producing an encoded digital audio signal by adding an identification signal for each track or each pair of tracks on the magnetic tape, said identification signal including a fade control signal, said delayed samples being the samples making up said one of the first and second sample groups and having been delayed by said first delay means, said undelayed samples being the samples making up the other one of the first and second sample groups and being obtained directly from said odd/even sample separating means;

second recording and reproducing means for recording and reproducing the encoded digital audio signal on and from the tracks of the magnetic tape, each of said tracks being recorded with the video information signal and the encoded digital audio signal respectively amounting to one field of said input video signal;

decoding means for decoding the encoded digital audio signal reproduced by said second recording and reproducing means and for producing the delayed samples and the undelayed samples;

second delay means for delaying the undelayed samples from said decoding means by said predetermined time; and audio signal producing means comprising means for producing a reproduced digital audio signal from the delayed samples obtained from said decoding means and delayed samples obtained from said second delay means by cross fading first samples and second samples responsive to the fade control signal in the identification signal and means for producing a reproduced analog audio signal by subjecting the reproduced digital audio signal to a digital-to-analog conversion, said first samples being reproduced from a certain track or pair of tracks for said predetermined time from a start of the certain track or pair of tracks, said second samples being reproduced from a preceding track or pair of tracks immediately preceding said certain track or pair of tracks for said predetermined time until an end of the preceding track or pair of tracks.

6. A magnetic recording and reproducing system as claimed in claim 5 in which said video information signal and said encoded digital audio signal are recorded in mutually different layer portions of a magnetic layer of the magnetic tape.

7. A magnetic recording and reproducing system as claimed in claim 5 in which said video information signal and said encoded digital audio signal are recorded time-divisionally in different portions of each track of the magnetic tape.

8. A magnetic recording and reproducing system as claimed in claim 5 in which said means for producing the reproduced digital audio signal in said audio signal producing means produces the reproduced digital audio signal by producing first pseudo samples by carrying out an interpolation on the delayed samples obtained from said first delay means, producing second pseudo samples by carrying out an interpolation on the undelayed samples obtained from said odd/even sample separating means, cross fading the delayed samples obtained from said first delay means and said first pseudo samples, and cross fading the undelayed samples obtained from said odd/even sample separating means and said second pseudo samples, said first pseudo samples being used in place of said other of the odd and even samples, said second pseudo samples being used in place of said one of the odd and even samples.

9. A magnetic recording and reproducing system as claimed in claim 8 in which said interpolation is a mean value interpolation.

10. A magnetic recording and reproducing system as claimed in claim 8 in which said interpolation is a previous value holding.

11. A magnetic recording and reproducing system as claimed in claim 5 in which said certain track or pair of tracks is recorded with said identification signal including a fade control signal which instructs a cross fade.

12. A magnetic recording and reproducing system as claimed in claim 5 in which a track or pair of tracks immediately subsequent to said certain track or pair of tracks is recorded with said identification signal including a fade control signal which instructs a cross fade.

* * * * *